April 11, 1967  L. J. MEYER  3,313,034
NUT MEAT DE-WATERING MACHINE
Filed Aug. 2, 1965  2 Sheets-Sheet 1
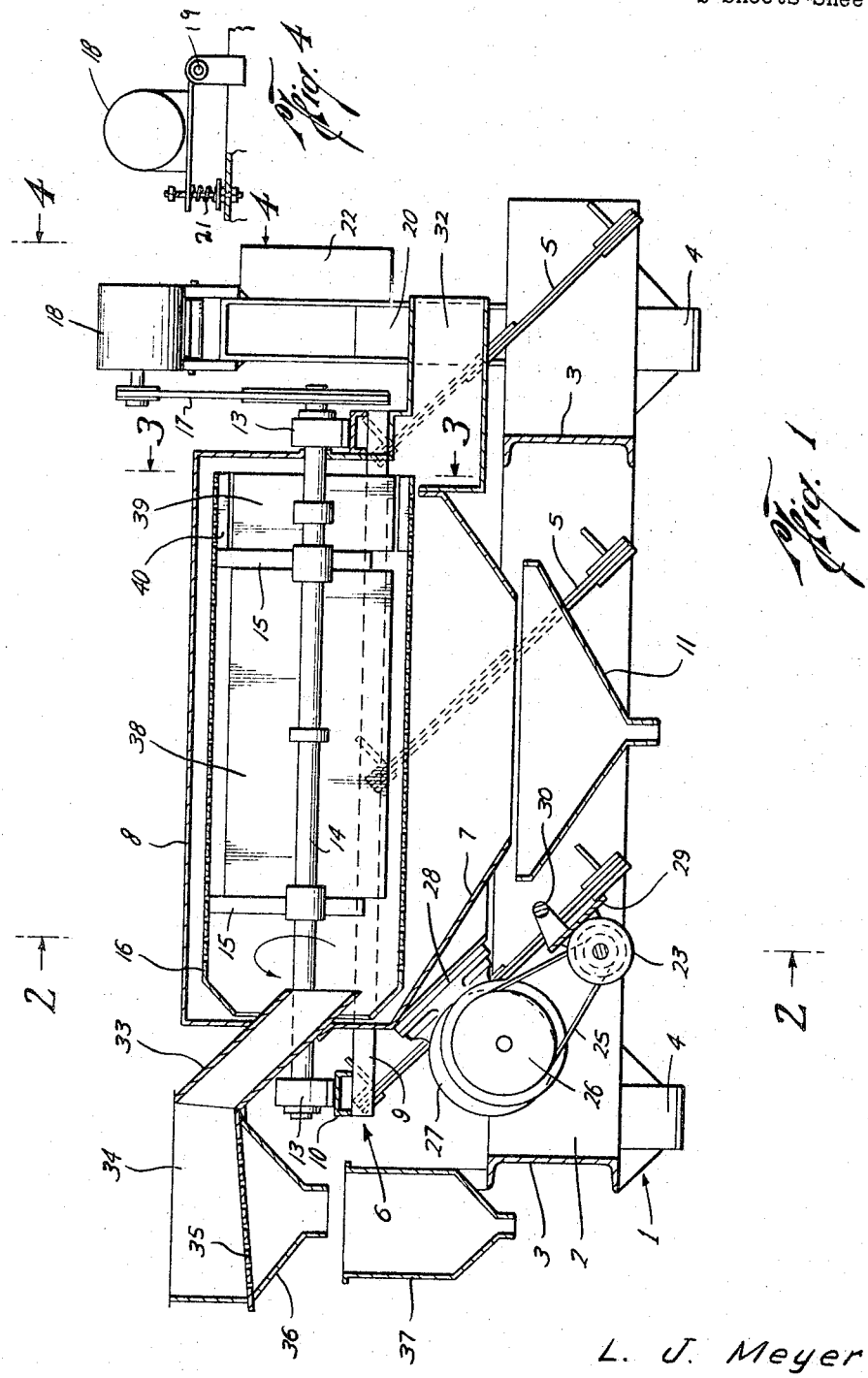
L. J. Meyer
INVENTOR.
BY G C Helmig
ATTORNEY

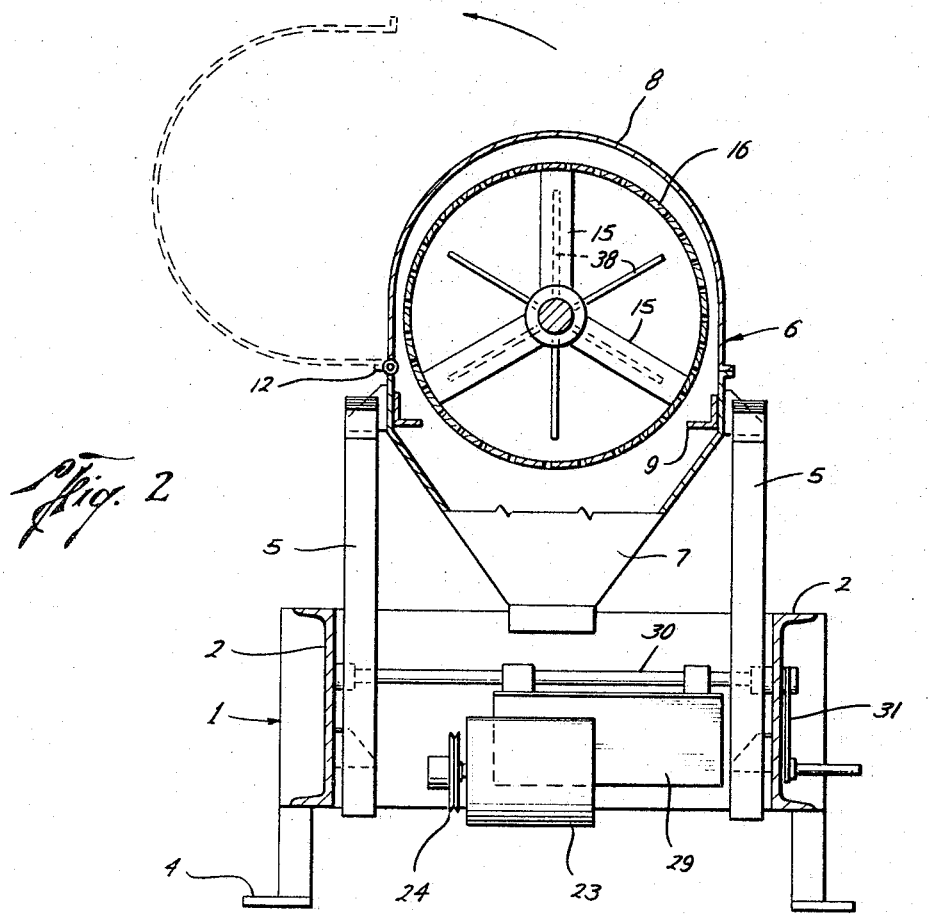
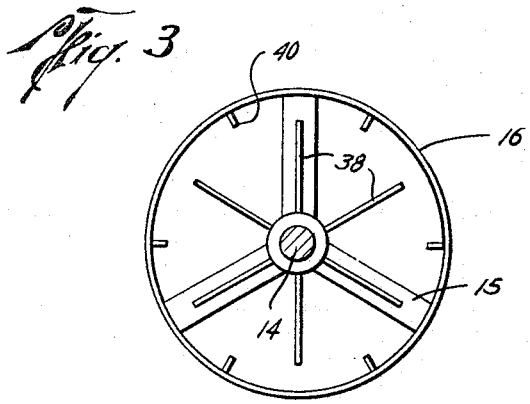

United States Patent Office 3,313,034
Patented Apr. 11, 1967

3,313,034
NUT MEAT DE-WATERING MACHINE
Leo J. Meyer, P.O. Box 5096, San Antonio, Tex. 78201
Filed Aug. 2, 1965, Ser. No. 476,571
8 Claims. (Cl. 34—53)

This invention relates to machinery for de-watering particle material and particularly to equipment for use in processing edible nut meats which, after separation from shells, need to be thoroughly cleaned by washing and drying in advance of packaging. Desirably, such processing is by moving the meat particles continuously through a succession of treatment stations including the shelling of nuts, removing broken shells, cleaning the edible particles, and finally packaging the meats. The equipment here involved has to do more particularly with a moisture-removing machine to operate on wetted particles following their having been washed and before drying heat is applied.

An object of the invention is to provide for continuous delivery of wetted particles into one end of a substantially horizontal cylinder having a perforated wall whose openings are smaller than the nut meats and which is continuously reciprocated in the general direction of its longitudinal axis and is periodically spun about such axis so that during each spinning phase the nut particles cling in retentive frictional contact with the foraminous wall and spread as a compact layer throughout the circular extent of the wall while the moisture is thrown from the particles and pass through the wall openings and during a non-spinning interval between alternate spinning phases, the substantially de-watered particles are vibrated and travel toward the outlet of the cylinder.

Other objects and advantages will become apparent from the following description taken with the accompanying drawings wherein:

FIG. 1 is a vertical longitudinal section of the improved machine in a preferred embodiment;

FIG. 2 is a transverse section on line 2—2 of FIG. 1;

FIG. 3 is a detail view as on line 3—3 of FIG. 1; and

FIG. 4 is a detail elevation of a cushion mounting for a drive motor.

In the drawings there is shown a base or main frame 1 comprised of a pair of spaced apart longitudinal channels 2—2 joined by front and rear cross members 3—3 and supported by suitable feet 4—4. Attachment brackets on each side channel 2 mount the lower ends of a group of leaf spring assemblies or packs 5—5 arranged three on each side of the machine in longitudinally spaced apart relation and in parallel planes inclined upwardly toward the inlet of the machine at an angle of approximately 45 degrees. At their upper ends the leaf spring packs are bracketed to a floating cradle 6 made up of a horizontally split water collecting housing having a bottom sheet metal section 7 and in upper sheet metal cover 8 together with stiffening members comprising angle straps 9—9 secured to the upper sides of the lower housing section 7 and joined by front and rear cross members 10—10 immediately beyond opposite ends of the housing.

The bottom housing section 7 has its four side walls tapered downwardly to a bottom opening for water discharge into a frame-carried funnel 11, from which water may be piped to a sewer or a recovery tank. For inspection and clean-out access to the interior of the housing, the top cover 8 is separable and conveniently is hinged as at 12 along one longitudinal side to an adjoining upper edge of the bottom housing section to enable the cover to be easily swung to an open position as indicated by broken lines in FIG. 2.

Mounted centrally of the cradle cross members 10 are journal bearings 13—13 for a rotatable shaft 14 having fixed thereon a pair of longitudinally spaced apart hubs of spiders each with three radial spokes 15 whose outer ends are joined to the interior of a cylinder 16 having a perforated or screening wall. The perforations through the wall are sized to be smaller than the nut meats so as to retain the meat particles within the cylinder and permit outflow of moisture thrown off from the meat surfaces.

The shaft 14 at its outer end carries a driven pulley to receive a V-belt 17 entrained on the spring closed sides of a drive pulley forming part of an electric motor 18. One end of the motor base is hinged at 19 to an upright standard 20 of the base frame and the other end of the motor base rests on a cushioning spring coil 21. This mounting accommodates relative vibratory movement between the base frame 1 and the spring mounted cradle 6. Electric current is supplied to power the motor 18 through a conventional cycling mechanism 22 whereby the cylinder is intermittently spun for a predetermined time interval at a speed predetermined for the extraction of moisture from prewashed nut meats. Following each spin interval the electric current is shut off and the cylinder rotation is allowed to slow down and come to a stop for a given no-spin phase.

Electric current is fed continuously throughout normal operation to a second electric motor 23 for effecting reciprocation of the cradle and cylinder through a short rapid stroke of about 3/16 inch generally in the direction of the rotatable shaft axis, but more particularly in an angular direction as determined by the relative disposition and resiliency of the leaf spring packs 5—5. On the shaft of this motor 23 is a spring-loaded variable speed pulley 24 for a V-belt 25 which is entrained on a driven pulley 26. The driven pulley 26 drives a conventional shaker device 27 of the weighted rotor type and is mounted by a bracket 28 on the cradle assembly 6 whereby the drive of the motor effects reciprocation of the cradle. A plate 29 secured on a rock shaft 30 mounts the motor 23 and the shaft 30 is journalled at its opposite ends in the main frame. At one end the rock shaft 30 has an adjusting handle 31 by which the plate 29 and the motor 23 can be swung and set in position for changing the effective diameter of the pulley 23 and thereby set the cradle reciprocatory speed rate within limits.

Opposite ends of the cylinder 16 are open to provide a rear outlet and a forward inlet. Discharge of the de-watered material from the cylinder outlet is downward into a feeder tray 32 which may lead to a conveyor by which the nut meats are delivered to a next succeeding processing station such as a drier. The forward or inlet end of the cylinder is for reception of washed or soaked particles from a chute 33 which is supported by the housing 7 and partakes of cradle reciprocation. The delivery chute 33 supports a hopper 34 having a perforated and rearwardly and upwardly inclined bottom wall 35 on which washed nut meats are deposited. Excess wash water will drain through the wall 35 and be directed downwardly by the tapered guide 36 whose delivery spout overlies the wider top opening of a collection vessel 37 which is to be piped to a recovery tank or sewer. Cradle reciprocation shakes the nut meats to assist water separation and to cause the meats to climb up the inclined wall 35 and drop within the chute 33 into the front end of the de-watering cylinder 16.

Within the cylinder interior and extended longitudinally between the spaced apart spiders 15—15 there are secured to and rotatable with the shaft 14, a number such as six of radial and equally spaced apart baffles in the form of flat plates 38 which terminate upwardly about one-half inch from the cylinder wall. The cylinder wall in this instance has an internal diameter of approximately eighteen inches and an axial dimension somewhat in excess of three feet. These baffles 38 serve to spread the treatment material evenly within the cylinder both longitudinally and circularly. A second and similar set of baffles 39 are carried by the shaft 14 within the outlet end of the cylinder and rearwardly from the rearmost spider 15. In the space between the successive baffles 39 the cylinder carries inwardly projecting ribs or narrow baffles 40 as best seen in FIG. 3, for the purpose of evening the flow of outcoming material into the outlet feeder 32.

In operation, the cylinder 16 is cycled through spin and no-spin phases by controlled drive from the motor 18 and is reciprocated longitudinally and continuously by drive from the motor 23. Wetted particles enter the cylinder continuously from the inlet feed hopper 34 and drop into the cylinder ahead of the foremost spider 15 and in advance of the spreader baffles 38. In the spin phase of the cylinder, the particles as spread out by the baffle plates and under centrifugal force move radially outwardly in a more or less uniform layer which clings frictionally against the perforated wall surface of the cylinder. They are retained within the cylinder while their wet coatings are thrown off and through the small perforations for collection and guidance downwardly within the housing sections 7 and 8. Although the rotating cylinder 16 is also undergoing short back and forth stroking, the stroking force is overcome or counteracted by the centrifugal force on and the frictional contact between the particles and against the perforated cylinder wall and no appreciable longitudinal particle travel takes place. At the end of each rotatable drive phase and with periodic slowing and stopping of rotation, the vibration imparted to the cylinder overcomes centrifugal force and shakes the material loose from the screen. The angle and amplitude of vibration as afforded by the inclined leaf springs and the forces imparted by the reciprocatory drive now causes the material to be thrown progressively upwardly and rearwardly toward the outlet of the reciprocating and non-rotating cylinder. On each return stroke, the cylinder wall is brought back under the bouncing material and the material falls to an advanced position rearwardly and again is propelled upwardly and toward the outlet in each to and fro cylinder movement. Material reaching the outlet of the cylinder falls into the outlet feeder whose reciprocation as a unit with the cradle will at all times bounce the material for even travel of the material to the next succeeding treating station which, as before indicated, usually will be one which directs hot air to complete drying of the particles prior to a packaging operation.

The foregoing has been a specific description of the preferred embodiment of the invention and it is to be understood that various changes and modifications can be made without departing from the scope of the invention as defined by the attached claims.

What is claimed is:

1. In a continuous particle treatment processing system wherein particles to be cleaned by a liquid wash and then dried travel in a continuous path through a succession of treatment stations, mechanism constituting one such station for operation on washed particles to de-water the same and comprising a substantially horizontally disposed cylinder having a perforated wall and being open at opposite ends to provide an inlet at one end and an outlet at the other end, the perforations of said wall being smaller than the particles to be treated so as to retain such particles within the cylinder, a bearing cradle supporting the cylinder for rotation about its longitudinal axis, means mounting said bearing cradle for reciprocation of the cylinder in the general direction of said longitudinal axis, drive means continuously imparting reciprocatory movement to the bearing cradle, and cycling mechanism having rotation-imparting drive connection with the cylinder and including a stop and go controller of rotation-imparting drive to the cylinder for cycling successive spin and non-spin phases of cylinder rotation throughout continuing cylinder reciprocation, whereby cylinder reciprocation in the non-spin phase impells the particles toward said outlet and in the spin phase, such impelling action is overcome by particle contact against the perforated wall.

2. In a continuous particle treatment processing system wherein particles to be cleaned by a liquid wash and then dried travel in a continuous path through a succession of treatment stations, mechanism constituting one such station for operation on washed particles to de-water the same and comprising a cylinder for the travel longitudinally therethrough of wetted particles, said cylinder having a perforated wall whose perforations are sized to pass moisture therethrough and hold the particles within the cylinder, a moisture-collecting housing surrounding the cylinder for receipt of moisture passing through the perforations, supporting bearings carried by the housing to mount the cylinder rotatably about its longitudinal center line on a substantially horizontal axis, resilient spring support suspending the housing and accommodating reciprocation thereof longitudinally of said axis, drive transmission means having connection with the cylinder for rotating the same at moisture-extracting spin rate and including an operating control of drive transmission which effects alternate periods of drive rotation and non-rotation, and power means joined to the housing and operated continuously throughout said alternate periods for reciprocating the housing and its supported cylinder, the reciprocatory force which acts on the particles being of such magnitude as to impel the particles toward one end of the cylinder in the non-rotative period and to be counteracted by particle friction on the cylinder wall under centrifugal force on the particles during cylinder rotation.

3. The structure of claim 2 wherein said housing has an upper inspection and clean-out opening together with a removable cover normally closing said opening.

4. The structure of claim 2 wherein the cylinder drive transmission means includes a motor and a timer controlling power feed to the motor for motor operation through intervals of given duration spaced apart for predetermined periods.

5. The structure of claim 2 wherein the opposite ends of the rotatable cylinder are open to provide a particle inlet thereto and a particle outlet therefrom, a particle feed hopper mounted on the housing for reciprocation therewith and provided with a top opening for reception of wetted particles, a perforated bottom wall in the hopper on which the particles are impelled in reciprocatory strokes toward said inlet and through which moisture can drain from the particles, and an outlet from the feed hopper discharging into the cylinder inlet.

6. The structure of claim 2, a cylinder drive shaft having spaced apart cylinder-supporting spiders inwardly spaced from the cylinder end portions, a series of substantially radially disposed baffle plates projecting longitudinally within the cylinder between said spiders and terminated at their radially outer margins in spaced relation with the cylinder wall so as to distribute particles around the circular extent of the cylinder wall during rotation thereof.

7. The structure of claim 6 together with ribs extended radially a relatively short distance inwardly from the interior of the cylinder wall and longitudinally within the cylinder space adjacent its outlet end and the next adjacent spider for resisting particle crowding.

8. The structure of claim 2 wherein said spring support comprises a number of leaf springs projecting in parallel relation to one another and inclined from the housing toward said one end of the cylinder at an angle to the axis of the cylinder.

References Cited by the Examiner
UNITED STATES PATENTS

| | | | |
|---|---|---|---|
| 2,416,499 | 2/1947 | Saxe | 210—385 X |
| 2,861,691 | 11/1958 | Link et al. | 210—384 X |
| 3,144,245 | 8/1964 | Martin | 34—126 X |

FREDERICK L. MATTESON, JR., *Primary Examiner.*